July 4, 1967  G. M. DAVIDSON ET AL  3,329,027
ACCELEROMETER
Filed Sept. 20, 1956  2 Sheets-Sheet 1

INVENTORS.
GARETH M. DAVIDSON
FRANKLIN MEYER
BY Raymond A. Paquin
ATTORNEY.

July 4, 1967 G. M. DAVIDSON ETAL 3,329,027
ACCELEROMETER
Filed Sept. 20, 1956 2 Sheets-Sheet 2

INVENTORS.
GARETH M. DAVIDSON
FRANKLIN MEYER

BY
Raymond A. Paquin
ATTORNEY.

United States Patent Office 3,329,027
Patented July 4, 1967

3,329,027
ACCELEROMETER
Gareth M. Davidson, Bronx, and Franklin Meyer, Franklin Square, N.Y., assignors to American Bosch Arma Corporation, a corporation of New York
Filed Sept. 20, 1956, Ser. No. 611,042
6 Claims. (Cl. 73—517)

The present invention relates to accelerometers, and has particular reference to vibrating string accelerometers.

A vibrating string accelerometer has been previously described in a co-pending U.S. patent application Ser. No. 586,615, filed May 22, 1956, in the name of Charles D. Bock; Paul S. Jorgensen and Joseph Statsinger for Accelerometer, and assigned to the assignee of this invention. With the arrangement there disclosed, a relatively complex computing means is employed to compensate for the non-linear relationship between the frequency change of a vibrating string and the acceleration of the craft. The present invention seeks to avoid this complexity, and is capable of providing a beat frequency output which is directly proportional to the applied acceleration.

The basic mechanical structure of the present accelerometer includes a pair of wires isolated by a central mass with one wire being solidly fixed at one end of a frame and the other wire being connected to a transducer fixed to the frame for varying the overall tension of the wires. During operation, both wires are excited into transverse vibration at their natural frequencies by electronic means, which frequencies are nominally equal in the absence of an external disturbance. If a system acceleration is applied in the direction of the wires, then a difference in tension in the wires results with a corresponding difference in the natural vibration frequencies, which are compared to produce a beat frequency output. Without an external compensation system, the magnitude of the beat frequency is a non-linear function of the applied acceleration.

The compensation provided by the present application is such as to keep the sum frequency constant by continuous monitoring of the initial tension so that the beat frequency is directly proportional in the acceleration, as will be shown.

In accordance with this invention, the two frequencies are fed into a non-linear network such as a demodulator and the sum frequency is filtered out. The sum frequency is then compared with an accurate standard reference frequency in a frequency discriminator. An output is produced in the discriminator when the frequencies of the two input signals are not exactly equal. This is fed into a high gain amplifier which feeds the tension-control transducer to vary the wire tension in a manner which tends to maintain the sum frequency equal to the reference frequency. Various types of tension control elements are available. For very fast response the use of a magnetostrictive transducer is preferred. Changes in the characteristics of the control element have negligible effect on the overall accuracy of the system, since the basic reference is an accurately controlled standard frequency.

For a more complete understanding of the invention, reference may be had to the accompanying diagrams, in which, FIG. 1 is a schematic diagram of the accelerometer system;

Figure 1:
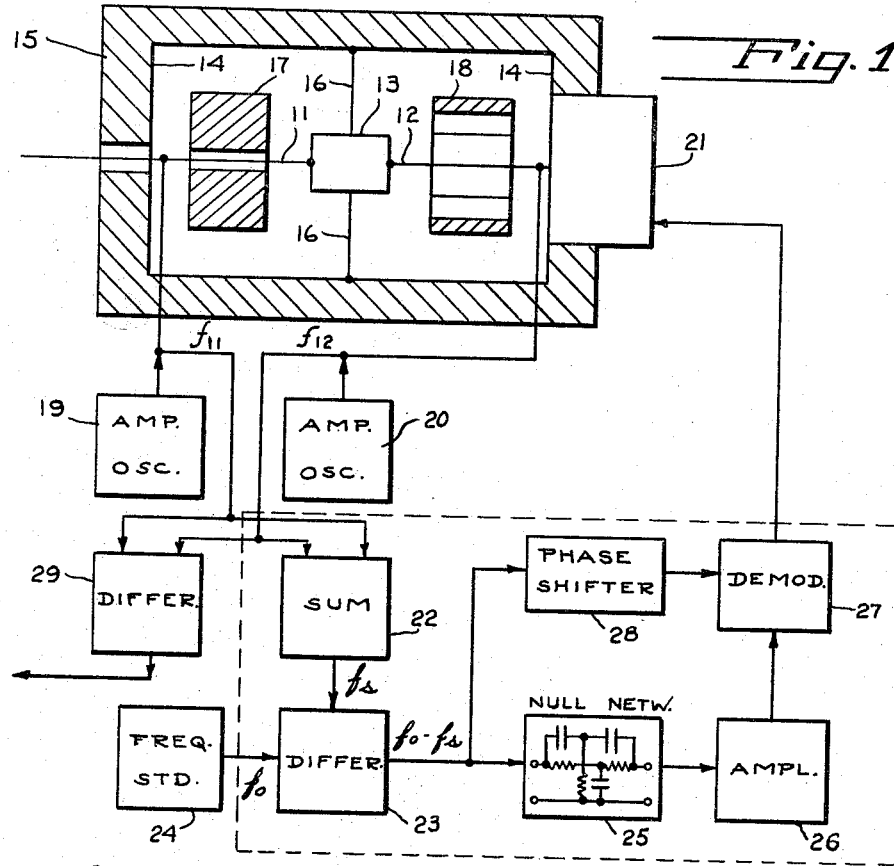

FIG. 1 shows schematically the general arrangement of the vibrating string accelerometer of this invention. The transducer 10 includes a pair of electrically conducting wires 11, 12 which are attached to a mass 13 and stretched between the supports 14 of a suitable frame 15. The mass 13 is additionally supported in the frame 15 by a plurality of symmetrically placed suspension members 16. Permanent magnets 17 and 18 are placed so as to provide transverse magnetic fields across the wires 11 and 12 respectively in mutually perpendicular directions. Each of the wires 11, 12 is placed in the circuit of its corresponding amplifier oscillator 19, 20 which is effective in keeping the wire 11 or 12 vibrating at its natural frequency as determined by the physical constants of the wire and the tension under which it is stressed. Such vibrating wire oscillators are not new, per se, and have been suggested for use in variable frequency standards for example.

In an accelerometer employing the vibrating string resonator, the acceleration force acting on a mass varies the natural frequency of the wire in accordance with a non-linear function of the acceleration. One remedy for this situation is described in the co-pending U.S. patent application Ser. No. 586,615 previously referred to. The present invention herein described is an improved arrangement whereby the complex remedial means of that application is made unnecessary. In accordance with the concepts of this invention, the tension in the wire 11, 12 is continuously monitored to keep the sum of the vibration frequencies of the wires 11, 12 at a constant value.

To this end an electromechanical transducer 21 is interposed between at least one wire 11 or 12 and the support 14. The transducer 21 may take many forms, several of which will be described, and any of which is adapted to adjust the tension in the wires 11, 12 in accordance with an electrical signal applied to the transducer 21. By this device, the sum frequency can be kept at a constant value under acceleration or under environmental changes, and if the sum frequency is kept constant, the difference frequency is a true indication of the acceleration as will be evident from the following discussion.

If it is assumed that the two wires 11 and 12 are identical in free length, $l$, and mass per unit length, $m$, the expressions for the frequency of vibration of each wire is given by:

$$f_{11}=\sqrt{\frac{T_{11}}{4l^2m}} \text{ and } f_{12}=\sqrt{\frac{T_{12}}{4l^2m}}$$

where $T_{11}$ and $T_{12}$ are the tensions in each wire 11 and 12. The values of $T_{11}$ and $T_{12}$ are respectively $$T_o+\frac{Ma}{2} \text{ and } T_o-\frac{Ma}{2}$$

where $T_o$ is the initial tension with no external disturbance, $a$ is the magnitude of the acceleration applied in the direction of the wires and $M$ is the mass of the weight 13. Therefore, it can be written that $$f_{11}=\sqrt{\frac{T_o}{4l^2m}+\frac{Ma}{8l^2m}} \quad (1)$$

and $$f_{12}=\sqrt{\frac{T_o}{4l^2m}-\frac{Ma}{8l^2m}} \quad (2)$$

The product of the sum and differences of (1) and (2) yields:

$$(f_{11}+f_{12})(f_{11}-f_{12})=f_{11}^2-f_{12}^2=\frac{Ma}{4l^2m} \quad (3)$$

It will be seen by Equation 3 that a value proportional to the acceleration and independent of the initial tension is produced by multiplication of the sum and difference frequencies. If now the sum frequency is kept constant, by controlling the initial tension, the difference frequency $f_{11}-f_{12}$ is directly proportional to the acceleration $a$. In the present instance this is accomplished by a null-type or closed loop control in the manner to be described.

In the following discussion, the terms "$f_a$ output," "$f_a$ component" or similar terms should be interpreted as signifying alternating voltages of constant amplitude and frequency equal to $fa$. The $f_{11}$ output of amplifier oscillator 19 and the $f_{12}$ output of amplifier oscillator 20 are applied to a frequency summing device 22 which produces an output voltage having a frequency $f_s$ equal to the sum of the frequencies of its input signals, $f_{11}+f_{12}$.

An illustrative summing device for this purpose is described in the co-pending patent application previously referred to, although any other device performing the required summation may be used, if desired.

The device described in the co-pending patent application uses a reference voltage having a frequency $f_r$ which is much higher than either $f_{11}$ or $f_{12}$, and a pair of demodulators, one having inputs of $f_r$ and $f_{11}$ and the other having inputs of $f_r$ and $f_{12}$. The $f_r+f_{11}$ output component of the first demodulator can be separated from the others by filter means, and the $f_r-f_{12}$ component of the second demodulator output can be similarly obtained. The $f_r+f_{11}$ voltage and the $f_r-f_{12}$ voltage are applied to a third demodulator and filter for obtaining a difference frequency component, whence the output component has a frequency $(f_r+f_{11})-(f_r-f_{12})$ or $f_{11}+f_{12}$ which is the desired frequency sum.

The $(f_{11}+f_{12})$ output of the summing device 22 is applied to a frequency difference device 23 which is also supplied with a reference voltage having a frequency $f_0$ from the frequency standard 24. The frequency $f_0$ is chosen to be a given amount $f_c$, greater than $f_{11}+f_{12}$ at zero accelerations.

Under zero acceleration, then, the output of the frequency difference device 23 is equal to $f_c$, and the sum frequency $f_{11}+f_{12}$ is known as the initial sum frequency. The nominal $fc$ output of the difference device 23 is applied to a discriminator or null network 25 which has a characteristic such that the magnitude of its output voltage is zero for signals of $fc$ frequency, and over a limited range the magnitude of the output voltage is proportional to the error $f_e$ between the value of $f_r-(f_{11}+f_{12})$ and $f_c$. A typical null network for this purpose is the twin-T network such as that shown in the rectangle marked 25.

The output of the network 25 is amplified in the amplifier 26 and rectified in the demodulator 27 to provide a D.C. signal proportional in magnitude to the null network output. In order to provide phase sensitivity to the demodulator 27, a reference voltage of the correct frequency and substantially constant magnitude is taken from the output of the frequency difference device 23. A phase shifting network 28 is interposed between the output of device 23 and the reference input to the demodulator 27 and is necessary to compensate for the phase shift introduced by the null network 25.

The D.C. output of the demodulator, now proportional in magnitude and direction to the difference between the actual sum frequency of the wires 11 and 12 and the initial sum frequency, is applied to the electromechanical transducer 31 which is adapted to vary the tension of the wires 11 and 12 in accordance with the error between the actual and initial sum frequencies, and to thereby reduce this error to zero.

Figures 2, 3:
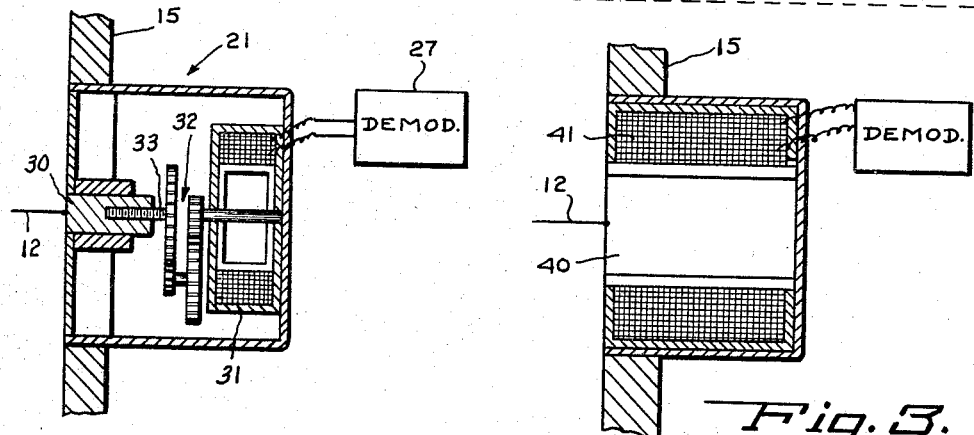
FIG. 2 illustrates one type of tension control transducer.
FIG. 3 illustrates another tension control transducer.

As mentioned earlier, it is contemplated that the transducer 21 may take many forms. FIG. 2, for example, shows one embodiment where the wire 12 is attached to a plug 30 which is adapted to be positioned with respect to the frame 15 by a servo motor 31. By means of gearing 32, motor 31 drives the screw shaft 33 which is threaded in the plug 30, the plug being non-rotatable in the frame 15. Motor 31 is energized by the output of the demodulator 29 whence motor positions the plug 30 to change the tension in the wires 11, 12 until the sum frequency of the wires 11, 12 is equal to the desired initial value so that the output of demodulator 27 is zero and motor 31 is deenergized.

It will be seen that this means will also be effective in eliminating such wire tension changes as may be caused by temperature variation, mechanical creep and other environmental conditions, and which would produce errors if not compensated for by other means.

Another embodiment of the transducer 21 is shown in FIG. 3 where a magnetostrictive member 40 located in the magnetic field of a solenoid 41 is interposed between the wire 12 and the frame 15. The winding of the solenoid 41 is connected to be energized by the output of the demodulator 27. Magnetostrictive elements have the property of changing dimensions under the application of magnetic fields, and this property can be used to adjust the wire tension.

Under acceleration, the sum frequency of wires 11, 12 changes in a direction such that an increase in tension is required to return the sum frequency to the initial value. Since the magnetostrictive element 40 always operates to increase its dimensions and thereby decrease the wire tension, no matter what the direction of the applied field, certain arrangements must be employed to get the desired reaction. For this reason the magnetostrictive element 40 is operated with a bias magnetic field in order to get motion in either direction.

The required bias field is preferably applied by making the initial non-operating tension in the wires 11, 12 much higher than the desired initial operating tension. The resulting deviation of the sum frequency from that prescribed by the reference frequency supply causes an output in the demodulator 26 such that the magnetostrictive element 40 expands to reduce the wire tension. A point of equilibrium will be reached when the demodulator output is sufficient to keep the sum frequency at the required value. Other means of biasing may be used if convenient, and the invention should not be limited by the embodiment described.

It is evident to those skilled in the art that other configurations of transducers may be employed such as those employing members which bend or twist for example under application of magnetic or electric fields with appropriate mechanical structure, or which produce proportional mechanical movement in response to electrical signals in any manner whatsoever.

Figure 4:
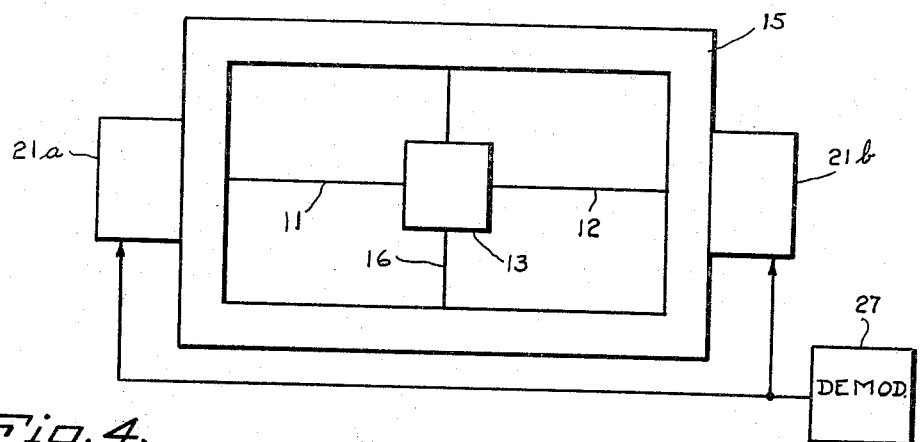
FIG. 4 is an alternative embodiment of the tension control.

In a further alternative, there are two tension control transducers 21$a$, 21$b$ one for each wire 11 and 12, as shown in FIG. 4. This arrangement has the advantage that the transducers 21$a$, 21$b$ effectively stretch the wires from both ends, so that the weight 13 and the suspension members 16 remain in constant relation to frame 15. In the electrical circuit, the transducers 21$a$ and 21$b$ would both be energized by the same signal, i.e., the output of the demodulator 27. The transducers 21$a$ and 21$b$ can be connected either in parallel or in series whichever is most desirable.

Figure 5:
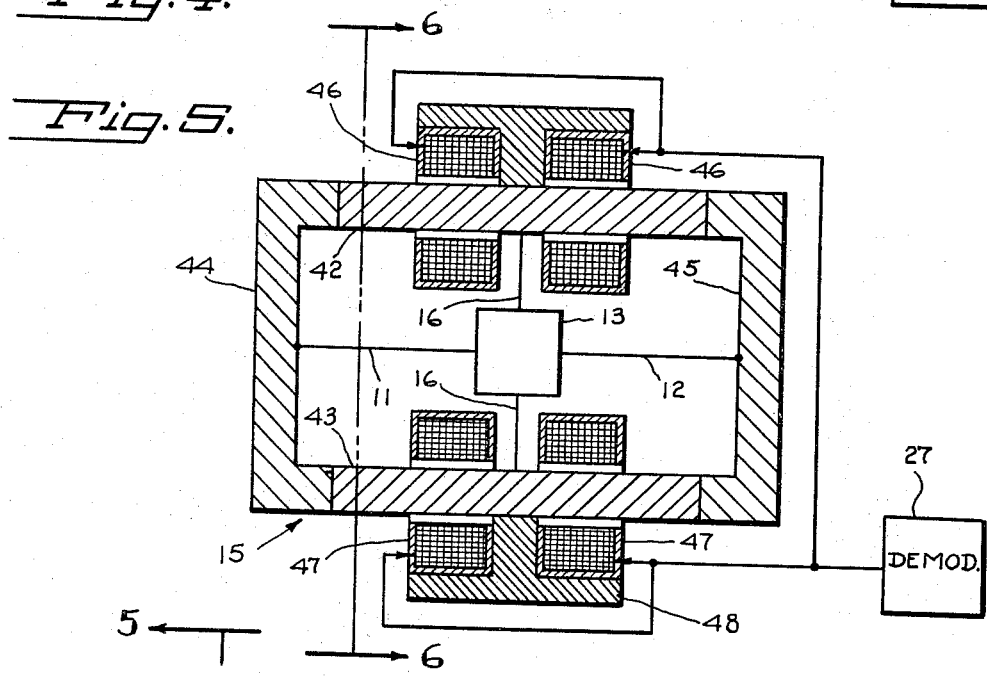
FIG. 5 illustrates another possible embodiment of the invention.

FIG. 5 shows a sectional view of another possible embodiment in which the frame 15 includes magnetostrictive legs 42 and 43 whereby the entire ends 44, 45 of the frame 15 are moved relatively to one another to effect the tension variation in wires 11, 12. In this embodiment, the magnetostrictive portions 42, 43 of the frame 15 are located within the respective twin solenoids 46, 47, the windings of which may be connected in series or parallel, whichever is found most desirable, across the output of demodulator 27. The vibrating string assembly of FIG. 5 is preferably mounted on the object whose acceleration is of interest by the center of the magnetostrictive elements 42, 43, since both ends 44, 45 must be free and the center weight 13 should be maintained stationary with respect to the object. The end pieces 44, 45 are of magnetic material to provide the return path for the magnetic flux.

Figure 6:
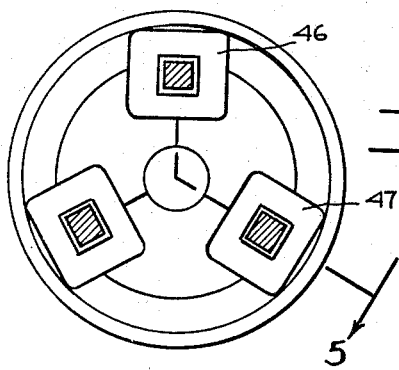
FIG. 6 is a sectional view through line 6—6 of FIG. 5.

To this end a mounting ring 48, which may have a T shaped cross section, is employed to support the frame 15 on the object and to support the solenoids 46, 47. It should be pointed out that the representation of FIG. 5 is merely schematic and illustrative, and that the physical embodiment of the frame 15 most likely contains three or more longitudinal pieces with spider shaped end pieces having an appropriate number of radial arms. For example, a section taken through line 6—6 of FIG. 5 may appear as shown in FIG. 6. However, the principle here described may be applied to any configuration by those skilled in the art without departing from the invention.

When the sum frequency is kept constant as herein described, the difference frequency as obtained in a demodulator filter arrangement 29 will be directly proportional to the acceleration of the support. A count of the beat frequency pulses will therefore be proportional to the integral of the acceleration, or to the velocity of the craft.

We claim:

1. In a device of the character described, a frame, a weight suspended in said frame by a plurality of suspension members, a pair of tension members connected between said weight and said frame and means for varying the tension of said tension members, according to the difference between a fixed frequency and the sum of the natural frequencies of said tension members, means for obtaining the sum of the natural frequencies of said tension members and means for energizing said tension varying means to keep the sum of said natural frequencies at a constant value.

2. In a device of the character described, a frame, a weight suspended in said frame by a plurality of suspension members, a pair of tension members connected between said weight and said frame and means for varying the tension of said tension members, according to the difference between a fixed frequency and the sum of the natural frequencies of said tension members, and means for vibrating said tension members at their natural frequency, means for obtaining the sum of the natural frequencies of said tension members and means for energizing said tension varying means to keep the sum of said natural frequencies at a constant value.

3. In a device of the character described, a frame, a weight, a pair of tension members connected between said weight and said frame, means for vibrating said tension members at their natural frequency and means for varying the tension of said tension members in a manner to keep the sum of the natural frequencies at a constant value, means for obtaining the sum of the natural frequencies of said tension members and means for energizing said tension varying means to keep the sum of said natural frequencies at a constant value.

4. In a device of the character described, a frame, a weight, a pair of tension members connected between said weight and said frame, means for vibrating said tension members at their natural frequency and means for varying the tension of said tension members, comprising means for obtaining the sum of the natural frequencies of said tension members, a standard frequency, means for obtaining the difference between said standard frequency and the sum of said frequencies and means for energizing said tension varying means according to said difference whereby said sum frequency is maintained at a constant value.

5. In a device of the character described, a frame including a pair of end pieces and magnetostrictive legs between said end pieces, a weight suspended in said frame by a plurality of suspension members, a pair of tension members connected between said weight and said end pieces and electrical means for varying the tension of said tension members, according to the difference between a fixed frequency and the sum of the natural frequencies of said tension members, said means comprising said magnetostrictive legs and means for applying a magnetic field to said magnetostrictive legs.

6. In a device of the character described, a frame including a pair of end pieces and magnetostrictive legs between said end pieces, a weight suspended in said frame by a plurality of suspension members, a pair of tension members connected between said weight and said frame and electromechanical means for varying the tension of said tension members, according to the difference between a fixed frequency and the sum of the natural frequencies of said tension members, said means comprising said magnetostrictive legs and means for applying a magnetic field to said magnetostrictive legs.

References Cited

UNITED STATES PATENTS

| 1,948,104 | 2/1934 | Firestone et al. | |
| 2,466,018 | 4/1949 | Ferrill | 310—26 X |
| 2,725,492 | 11/1955 | Allan | 264—1 X |

FOREIGN PATENTS

| 729,894 | 12/1942 | Germany. |

RICHARD C. QUEISSER, *Primary Examiner.*

A. BLUM, SAMUEL BOYD, A. M. HORTON,
*Examiners.*

J. J. GILL, W. J. CURRAN, *Assistant Examiners.*